United States Patent [19]

Newton

[11] 4,251,997
[45] Feb. 24, 1981

[54] CONTROL OF ABSORPTION SYSTEMS ENERGIZED FROM PLURAL STORAGE TANKS MAINTAINED AT DIFFERENT TEMPERATURES

[75] Inventor: Alwin B. Newton, York, Pa.

[73] Assignee: Borg-Warner Corporation, Chicago, Ill.

[21] Appl. No.: 26,463

[22] Filed: Apr. 2, 1979

[51] Int. Cl.³ .................... F25B 15/00; F25B 27/00; F25B 27/02
[52] U.S. Cl. ............................................. 62/101; 62/2; 62/148; 62/476; 62/238 E; 62/238 B
[58] Field of Search ............... 62/2, 148, 476, 238 B, 62/238 E, 101

[56] References Cited

U.S. PATENT DOCUMENTS

| 3,895,499 | 7/1975 | Hopkins | 62/476 |
| 3,928,983 | 12/1975 | Ainbinder et al. | 62/476 |
| 4,012,920 | 3/1977 | Kirschbaum | 62/2 |
| 4,019,495 | 4/1977 | Frazier | 126/437 |
| 4,023,375 | 5/1977 | Chinnappa et al. | 62/2 |
| 4,028,078 | 6/1977 | Peckham | 62/2 |
| 4,111,259 | 9/1978 | Lebduska | 62/2 |
| 4,153,104 | 5/1979 | Ruder | 62/2 |
| 4,179,895 | 12/1979 | Shimokawa et al. | 62/2 |

OTHER PUBLICATIONS

Ashrae Journal, Nov. 1976, "Optimizing Solar Cooling Systems", pp. 26-31 relied on.

Primary Examiner—Lloyd L. King
Attorney, Agent, or Firm—Thomas B. Hunter

[57] ABSTRACT

An absorption refrigeration system is adapted to be energized by plural sources of a heating system stored at different temperatures. A control system automatically selects the proper source of supply to the generator in response to the temperatures of the heating medium of the plural sources and to the temperature of heated medium entering the generator. The temperature of heated medium entering the generator is dependent upon the respective temperatures of (1) the cooling water, used to cool the condenser and absorber coils, and (2) the chilled water supplied to the load, vary in response to changing conditions.

9 Claims, 3 Drawing Figures

CONTROL OF ABSORPTION SYSTEMS ENERGIZED FROM PLURAL STORAGE TANKS MAINTAINED AT DIFFERENT TEMPERATURES

BACKGROUND OF THE INVENTION

1. Field of the Invention

Absorption refrigeration systems having means for automatically controlling the energizing medium.

2. Description of the Prior Art

In U.S. Pat. No. 3,895,499 issued to N. E. Hopkins on July 22, 1975, there is described an absorption refrigeration system in which the cooling tower water is essentially uncontrolled and allowed to vary as influenced by the temperature of the ambient air flowing through the cooling tower in contact with the water spray devices. In the Hopkins system, the heat input to the generator is controlled in response to the entering or leaving chilled water temperature as is conventional in absorption machines. The basic concept embodied in the Hopkins system is a means for transferring solution from one point to another to prevent a dangerous operating condition.

In U.S. Pat. No. 4,164,128 issued to A. B. Newton on Aug. 14, 1979, there is described an absorption refrigeration system which is adapted to be powered by solar energy or a source of relatively low temperature waste heat. A control system automatically adjusts the maximum energizing temperature as the temperature of the cooling water and the temperature of chilled water supplied to the load vary from time to time.

An article by A. B. Newton entitled "Optimizing Solar Cooling Systems", ASHRAE Journal, November 1976, pp. 26–31, suggests that plural compartments for the storage of heated medium at different temperatures may be used in a solar powered absorption system. No specific means are described for controlling the selection of the storage compartments.

SUMMARY OF THE INVENTION

Absorption air conditioning systems have been used for many years both in residential and commercial applications. This type of equipment responds very well over an entire range of imposed loads and external conditions. In the aforementioned U.S. Pat. No. 4,168,128, it was proposed to modify the energizing temperature of the fluid supplied to the generator in response to varying load and/or cooling tower water temperature conditions. Significant savings can be achieved by modifying the maximum energizing temperature depending on the temperature of the available cooling tower water.

The present invention may be regarded as an improvement on the system described in U.S. Pat. No. 4,164,128, and is especially applicable to solar energized systems. It is known that buildings require many more hours of air conditioning at light and medium load conditions than they do at full load. Accordingly, much less heat is required for energizing per kilowatt (Kw) of cooling at medium and light loads if the cooling tower water temperature is allowed to seek its natural level dependent on the load and the existing wet bulb temperature. The aim, therefore, should be to store at maximum temperature only the amount of heat needed during peak operating hours, and to store at intermediate temperatures the greater amounts of heat required for light loads.

One solution to this problem is to divide the storage medium for energizing the absorption system into several different compartments so that heat can be stored at different temperatures. On the assumption that water is the storage medium, the size of the tanks can then be adjusted according to the Kw-hours of cooling needed under each set of conditions required to be handled by a given temperature level. For example, 65% of the total heat storage might be at a temperature of 70° C. and the balance of the heat stored in a smaller more fully insulated tank, at a higher temperature of 95° C. This latter tank would be reserved for periods of high load and high cooling water temperature.

Solar collectors have a highly variable rate of heat collection. More heat can be collected at lower temperatures; and high temperature water can be collected only during the mid-day hours. Water collected during this period would be diverted to the high temperature storage tank for use during peak load periods while heated water collected at other times during the day would be stored in the lower temperature tank. The system is designed so that it will automatically select the proper storage tank in which to draw the energizing medium depending on temperatures of the heating medium in the storage tanks and the temperature of heated medium entering the generator. The generator input temperature will be dependent upon the cooling load, and the temperature of the cooling tower water which is a major factor in determining the maximum energizing temperature for optimum performance.

BRIEF DESCRIPTION OF THE DRAWINGS

These and other objects and advantages of the present invention will become more fully apparent from the following detailed description when read in conjunction with the accompanying drawings wherein.

DETAILED DESCRIPTION OF THE PREFERRED EMBODIMENT

Figure 1:
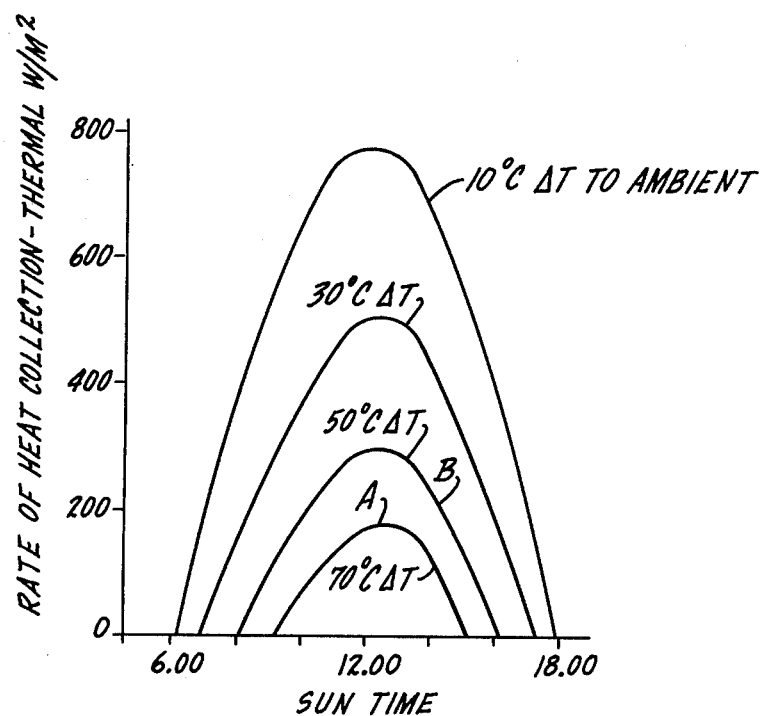
FIG. 1 is a graph illustrating the rate of heat collection at varying temperature differentials with respect to ambient air temperature at various times of the day for a typical solar collector.

Referring now in detail to the drawings, there is shown in FIG. 1 the amounts of heat which can be collected on a perfect day (cloudless daytime skies) by a typical flat plate collector. The vertical axis depicts the rate of heat collection for varying temperature differentials of water above the ambient air temperature, and the horizontal axis depicts the times of the day; therefore, the areas under the respective curves correspond to the amount of heat collected during a given time interval. It can thus be seen that the lower the storage temperature the more total heat can be collected in a day. Since it is evident that no useful heat can be collected and introduced into storage at a temperature below that which is already existing in the storage, there is a longer delay at the sunrise before a useful temperature is reached when a higher storage temperature is selected.

For example, if a single storage was selected to be maintained at 90° C. and the ambient temperature is at 20° C. then curve A of FIG. 1 would apply since the differential temperature would be 70°. As a result, a relatively small amount of heat can be stored during the day. However, if the storage were selected to be 70° C. rather than 90° C. and the ambient temperature was still at 20° C., then more than twice the heat could be placed into storage since curve B would apply due to the fact that the differential temperature would be 50°. In view of the foregoing, effective heating would be realized at a lower temperature in storage.

Since it is not always possible to predict when different storage temperatures and different outdoor ambient temperatures will exist, it would be desirable to separate the storage into several different compartments so that heat can be stored at different temperatures. For example, a first storage tank can be used to store heat at a relatively high temperature to accommodate full load conditions, and a second storage tank can be used to store heat at a lower temperature for light and medium load conditions. The actual methods of controlling the output of a solar collector so as to ensure that the heat is properly introduced into either the first or second storage tank are well known in the art. One such method utilizes a differential temperature control for each storage tank and is described in the earlier mentioned article by A. B. Newton entitled "Optimizing Solar Cooling Systems".

Figure 2:
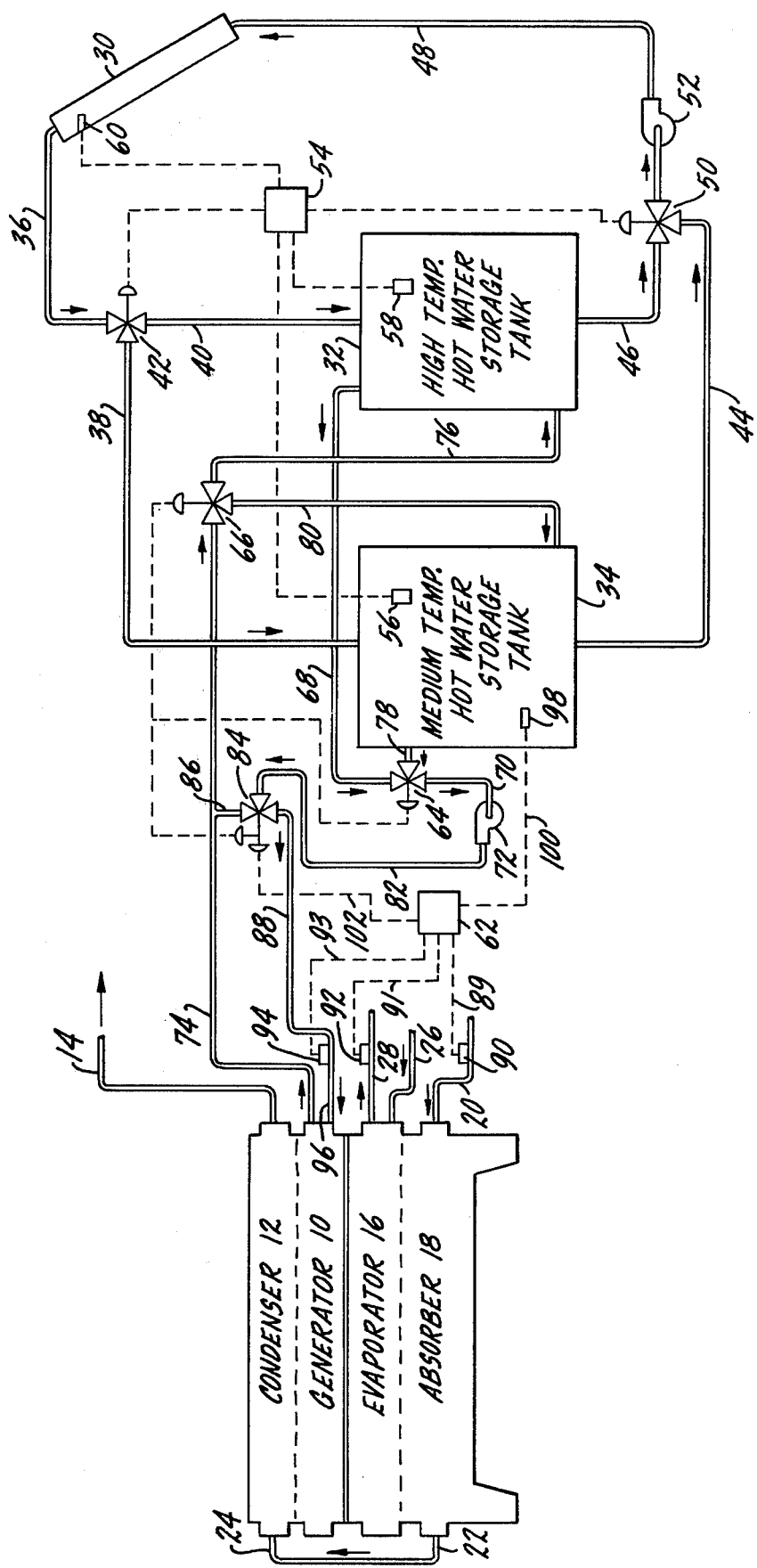
FIG. 2 is a schematic diagram of an absorption refrigeration system embodying the principles of the present invention.

In accordance with the principles of the present invention, there is shown in FIG. 2, in schematic form, an absorption refrigeration system which is selectively and automatically energized by plural sources of a heating medium stored at different temperatures. The refrigeration system includes a generator 10 which is supplied with a heated fluid as will be described more fully hereinafter. Vapor released in the generator 10 flows to a condenser 12 having a heat-exchanger coil whose outlet is connected via a line 14 to a cooling tower (not shown). The condenser 12 is connected to an evaporator 16 which is coupled to an absorber 18. The absorber is provided with a heat-exchanger coil whose inlet is supplied with cooling tower water from the cooling tower via line 20. The outlet of the absorber coil is on line 22 which communicates with the inlet of the condenser coil on line 24. An air-conditioning load (not shown) is connected to a heat-exchanger coil in the evaporator 16 by way of supply line 26 and return line 28. It will be appreciated that the conventional absorption system includes many other features which are not shown in FIG. 2. These features have been purposely omitted to simplify the drawing for ease of illustration.

In order to heat a heat-exchanger coil in the generator 10, a suitable primary source of thermal energy is utilized such as solar energy. Solar collector 30 supplies a heated medium such as hot water to storage tanks 32 and 34 through lines 36, 38 and 40 and a three-way control valve 42. Water is returned from the tanks 32, 34 to the solar collector 30 through lines 44, 46 and 48 and a three-way control valve 50 and is recirculated by means of a pump 52. The storage tank 32 is used to store a relatively high temperature (95° C.) of hot water for energizing the generator 10. The storage tank 34 is used to store a lower medium temperature (70° C. or less) of hot water for energizing the generator. A collector/storage tank controller 54 receives input signals from temperature sensors 56, 58 and 60 for controlling the valves 42 and 50 so as to select the proper tank for storing the hot water. Dependent upon the input signals, the hot water will be circulated to either storage tank 32 or storage tank 34.

The heated water supplied to the generator 10 as the heating medium will be from either storage tank 32 or storage tank 34 and will be selected automatically by the operation of a capacity/storage controller 62. The controller 62 regulates three-way control valves 64, 66 to determine whether the heated water delivered to the generator 10 is to be supplied from tank 32 or tank 34. If tank 32 is utilized as the generating medium, water will enter supply circuit through lines 68, 70 and will be circulated by pump 72. After returning from the generator 10 will be through lines 74, 76. On the other hand, if tank 34 is used, water will enter the supply circuit through lines 70, 78 for circulation by the pump 72. Then, the water will be returned from the generator 10 to lines 74, 80.

The heated water in the line 70 is pumped by the pump 72 through a line 82 to a three-way proportional control valve 84. The valve 84 directs the water in the line 82 back to one of the storage tanks 32, 34 through line 86 or bypasses the said one of the tanks directly to the inlet of the heat-exchanger coil of the generator 10 through line 88. The ratio of water flow returned to storage for reheating to the water flow bypassing the said one of the storage tanks effectively controls the temperature of the water delivered to the generator 10. If a lower energizing temperature is desired, valve 84 is adjusted to deliver more water through line 88 and a corresponding decrease flow through line 86. If an increase in energizing temperature is needed, more water is returned to the said one of the storage tanks through line 86 and therefore more of the higher temperature water in the said one of the storage tanks flows into the supply circuit through line 82. The total flow (GPM) through the pump 72 remains constant.

The three-way proportional control valve 84 is also controlled by the capacity/storage controller 62 to maintain automatically the proportion of hot water being bypassed the tanks 32, 34 and delivered directly to the generator 10 in response to certain conditions such as cooling tower water temperature and the temperature of chilled water supplied to the load. The capacity/controller 62 receives a first input representative of the cooling tower water temperature through line 89 by means of a temperature sensor 90 located on the line 20. The temperature sensor 90 can also be located on the line 14 in lieu of line 20 if desired. A second input is sent through line 91 by a temperature sensor 92 on the line 28 detecting the leaving chilled water temperature which is supplied to the load. Similarly, the sensor 92 can be positioned on the line 26 rather than on the line 28, if desired, to detect the entering chilled water temperature. A third output is transmitted to the controller 62 via line 93 by a temperature sensor 94 located on line 96 which measures the temperature of the fluid delivered to the heat-exchanger coil of the generator 10. A temperature sensor 98 is located on the storage tank 34 for measuring its temperature and for delivering such measurement as a fourth input via line 100 to the controller 62. The controller 62 has two output signals on line 102, one signal for controlling the valve 84 and the second signal for controlling the valves 64, 66.

Figure 3:
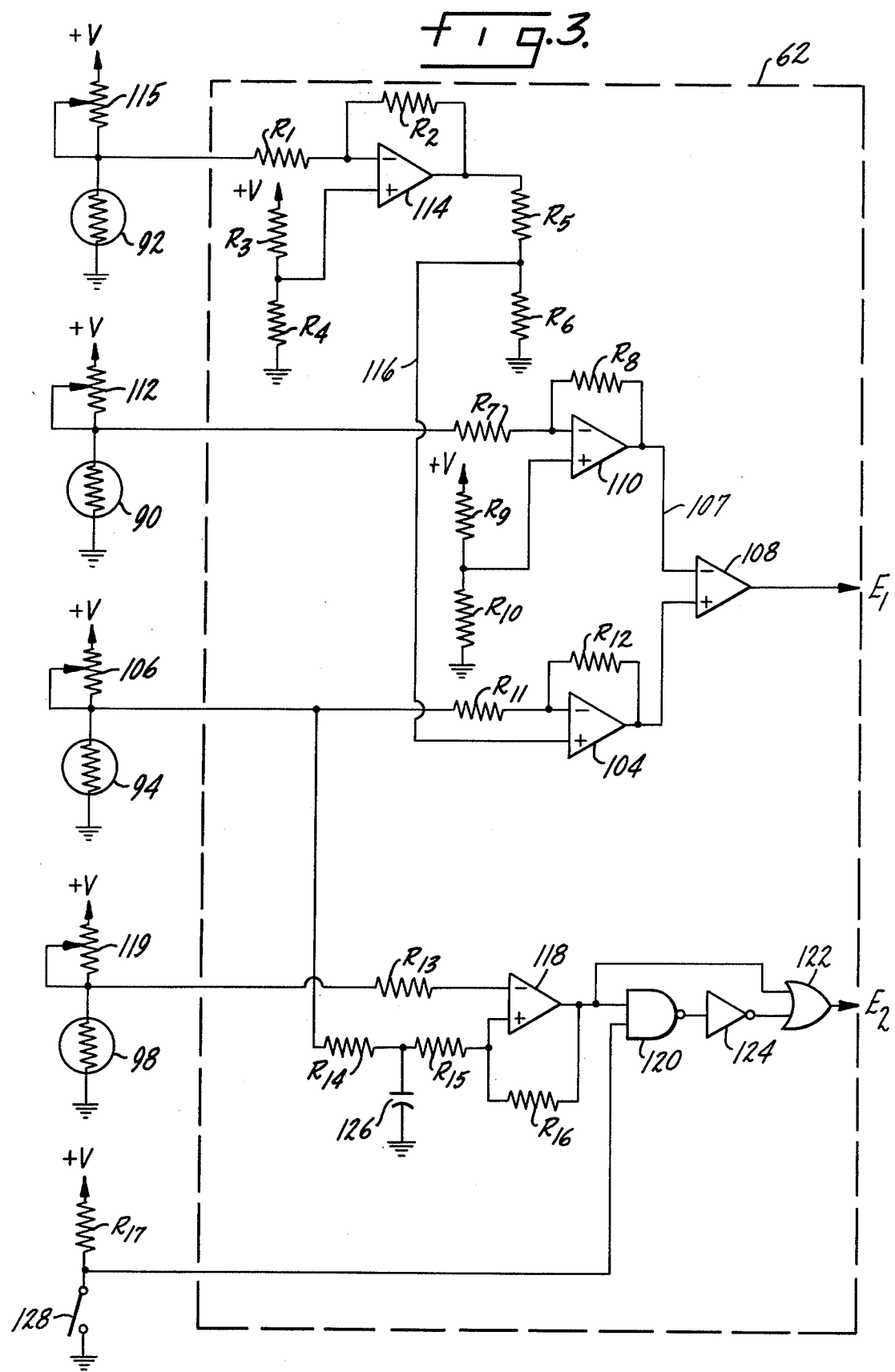
FIG. 3 is a simplified circuit diagram illustrating the capacity/storage controller circuit utilized for automatically selecting the proper storage tank from which to draw the energizing medium as the generator heat input.

With reference to FIG. 3 of the drawings, there is shown a preferred embodiment of the capacity/storage controller 62 in the present invention for automatically selecting the proper storage tank as the energizing medium to the generator 10. The controller 62 includes also detailed circuitry for modifying the energizing temperature to the generator 10 in response to the chilled water temperature and the cooling tower water temperature. It should be understood that while the controller 62 can be constructed in any number of other known ways such as mechanical, pneumatic, and the like, the preferred controller utilizes solid-state electronic circuits employing thermistors as the aforementioned sensors.

An operational amplifier 104 receives an input signal on its inverting input from the thermistor 94 sensing the input temperature to the heat-exchanger coil of the generator 10. The output of the amplifier 104 is an electrical signal which corresponds to the temperature of the energizing medium and is adjustable by a potentiometer 106 to any desired value. The output of the amplifier 104 is connected to the inverting input of an operational amplifier 108 whose output voltage is used to operate the control valve 84 which bypasses a certain amount of heating fluid to maintain the temperature of the energizing fluid delivered to the generator at the desired temperature. For example, if the temperature of the heating fluid should rise above the desired point, as sensed by the thermistor 94, then the voltage at $E_1$ would increase and cause control valve 84 to begin bypassing a certain amount of fluid instead of returning it to one of the storage tanks 32, 34 via the line 86.

An operational amplifier 110, which receives an input signal on its inverting input from the thermistor 90 sensing the cooling tower water temperature, has its output via line 107 applied to the non-inverting input of amplifier 108. The output of amplifier 110 is adjustable to any desired value by a potentiometer 112. In operation, assuming the temperature of the cooling tower water is above 75° F., the output voltage of amplifier 110 on line 107 is at a given level. When the cooling tower water temperature falls below 75° F., the output voltage on line 107 will shift to a different level so that the output of amplifier 108 controlling the valve 84 is modified. It is therefore serving the function of reducing the energizing temperature to the generator 10 in a desired manner.

An operational amplifier 114 receives an input signal on its inverting input from the thermistor 92 sensing the chilled water temperature. The output of the amplifier 114 is adjustable to any desired value by a potentiometer 115 and is transmitted via line 116 to the non-inverting input of the amplifier 104. In operation, assuming the temperature of the chilled water is above 45° F., the output voltage of amplifier 114 on line 116 is at a given level. When the chilled water temperature falls below 45° F., the voltage on the line 116 will shift to a different level so that the output of amplifier 104 is varied. This, in turn, results in a further modification of the output of amplifier 108, thereby reducing the energizing temperature in response to the lowered chilled water temperature.

An operational amplifier 118 receives an input signal on its inverting input from the thermistor 98 sensing the temperature of the storage tank 34. This input signal is adjustable to any desired value through a potentiometer 119. The signal from the thermistor 94 sensing the input temperature to the generator 10 is also applied to the non-inverting input of amplifier 118. Thus, the amplifier 118 functions as a comparator and delivers its output to one input of a NAND gate 120 and one input of an OR gate 122. An inverter 124 is interconnected between the output of the NAND gate 120 and the other input of the OR gate 122. In normal operation during light and medium load conditions, the temperature of the generator input as measured by the thermistor 94 will be lower than the temperature of the storage tank 34 holding the lower temperature of hot water measured by thermistor 98. Under this condition, voltage $E_2$ at the output of the OR gate 122 will be at a high or "one" level to position the valves 64, 66 so that the storage tank 34 is utilized. However, when there is a high load condition (increase in the cooling tower water temperature, the temperature of the generator input will also increase. At a point where the temperature measured by the thermistor 94 exceeds the temperature measured by the thermistor 98, the voltage $E_2$ will shift to a low or "zero" level to position the valves 64, 66 so that the storage tank 32 holding the high temperature hot water is used.

In order to initiate immediate boiling in the generator 10 on start up of the pump 72, it would be desirable to utilize the higher temperature from the storage tank 32 and to prevent any bypass of fluid directly to the generator 10. To this end, there is provided a capacitor 126 which is initially uncharged to maintain the output of amplifier 118 to a low level and a switch 128 is made to close applying a low level to the second input of the NAND gate 120. As a result, the voltage $E_2$ is held at a low level thereby positioning valve 64, 66 so that the storage tank 32 is used. The various values of resistance for resistors $R_1$ through $R_{17}$ are to be selected for the proper energized temperature, cooling tower water temperature, chilled water temperature, and the temperature of the lower temperature storage tank.

From the foregoing description of the capacity/storage controller embodying the present invention, it can be seen that there is provided an absorption refrigeration system which is adapted to be energized by plural sources of a heating medium stored at different temperatures. The capacity/storage controller automatically selects one of the plurality of tanks as the source of the heated fluid to energize the generator in response to the temperatures of the heated fluid in the plurality of tanks and the temperature of the heated fluid entering the generator. Further, the capacity/storage controller can be controlled during start-up of the refrigeration system so that the source of the heated fluid to energize the generator is from the tank with the higher temperature. It should be understood that the principles of the present capacity/storage controller can also be utilized when there are more than two storage tanks.

While there has been illustrated and described what is considered at present to be a preferred embodiment of the present invention, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention, but the invention will include all embodiments falling within the scope of the appended claims.

What is claimed is:

1. A control system for a closed circuit, continuous cycle absorption refrigeration machine of the type including a generator, a condenser, an absorber, and evaporator through which chilled water is circulated, and means for supplying a cooling fluid to the absorber and condenser, said control system comprising:

means for storing heated fluids adapted for energizing the generator in a plurality of tanks at different temperatures:

means for sensing the temperature of the heated fluid in at least one of the plurality of tanks;

means for sensing the temperature of the heated fluid entering the generator; and means responsive to the comparison of the temperatures of the heated fluid in said plurality of tanks with the temperature of the heated fluid entering the generator for automatically selecting one of the plurality of tanks as the source of the heated fluid to energize the generator.

2. A control system as claimed in claim 1, further comprising means for modifying the maximum energizing temperature of the fluid entering the generator in the response to changes in the temperature of the cooling fluid and in the temperature of the chilled water circulated through the evaporator.

3. A control system as claimed in claim 1, further comprising means for controlling said selecting means during start-up of the refrigeration machine so that the source of the heated fluid to energize the generator is from the tank with the highest temperature.

4. An absorption refrigeration apparatus comprising:

a generator, a condenser, an absorber, and an evaporator all connected in a closed circuit, continuous cycle system;

means for supplying a cooling fluid to said absorber and to said condenser;

means for storing heated fluids adapted for energizing the generator in a plurality of tanks at different temperatures;

means for sensing the temperature of the heated fluid in at least one of the plurality of tanks;

means for sensing the temperature of the heated fluid entering the generator; and means responsive to the comparison of the temperatures of the heated fluid in said plurality of tanks with the temperature of the heated fluid entering the generator for automatically selecting one of the plurality of tanks as the source of the heated fluid to energize the generator.

5. An apparatus as claimed in claim 4, further comprising means for modifying the maximum energizing temperature of the heated fluid entering the generator in response to changes in the temperature of the cooling fluid and in the temperature of the chilled water circulated through the evaporator.

6. An apparatus as claimed in claim 4, further comprising means for controlling said selecting means during start-up of the refrigeration machine so that the source of the heated fluid to energize the generator is from the tank with the highest temperature.

7. A method of operating a closed circuit, continuous cycle absorption refrigeration machine of the type including a generator, a condenser, an absorber, an evaporator through which chilled water is circulated, and means for supplying a cooling fluid to the absorber and condenser, said method comprising the steps of:

storing heated fluids for energizing the generator in a plurality of tanks at different temperatures;

sensing the temperature of the heated fluid in at least one of the plurality of tanks;

sensing the temperature of the heated fluid entering the generator; and selecting one of the plurality of tanks as the source of heated fluid to energize the generator in response to the comparison of the temperatures of the heated fluid in the plurality of tanks with the temperature of the heated fluid entering the generator.

8. A method as claimed in claim 7, further comprising the step of modifying the maximum energizing temperature of the heated fluid entering the generator in response to changes in the temperature of the cooling fluid and in the temperature of the chilled water circulated through the evaporator.

9. A method as claimed in claim 7, further comprising the step of controlling the selecting step during start-up of the refrigeration machine so that the source of the heated fluid to energize the generator is from the tank with the highest temperature.

* * * * *